Aug. 14, 1934.　　　　A. O. COBBS　　　　1,969,925
CERTIFICATE OR LIKE HOLDER
Filed Oct. 30, 1933
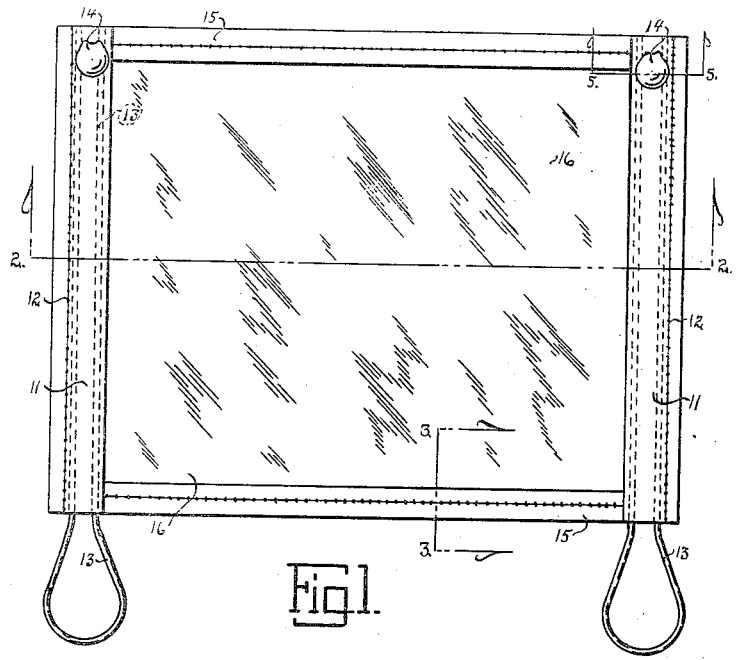
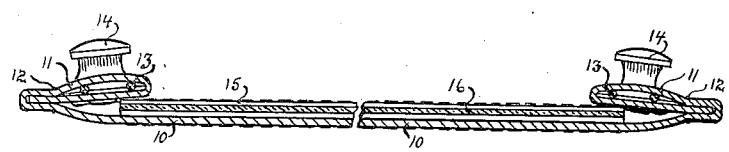
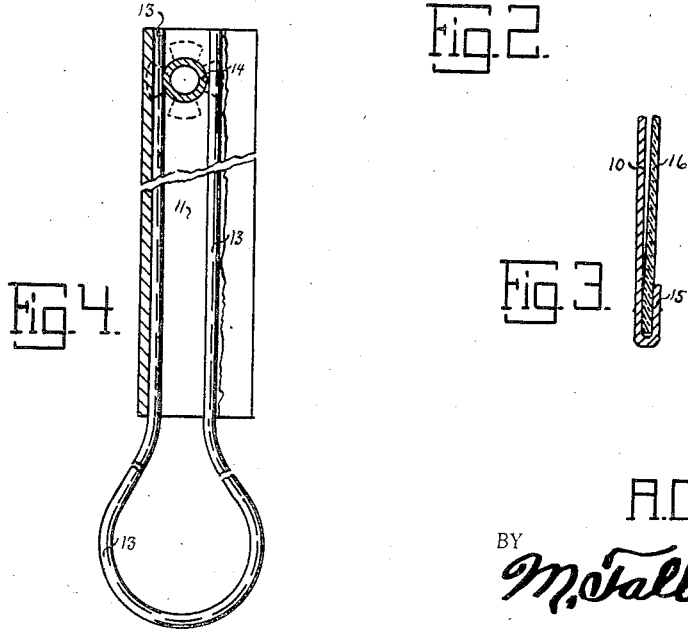
INVENTOR.
A.O. COBBS
BY
M. Talbert Dick
ATTORNEY.

Patented Aug. 14, 1934

1,969,925

UNITED STATES PATENT OFFICE 1,969,925

CERTIFICATE OR LIKE HOLDER

Ansalem Orville Cobbs, Des Moines, Iowa

Application October 30, 1933, Serial No. 695,837

6 Claims. (Cl. 40—10)

The principal object of my invention is to provide a holder for use in connection with automotive vehicles for the displaying of identification cards or certificates that is capable of being quickly and easily attached or detached from the steering wheel column of the vehicle in which it is used.

A further object of my invention is to provide a certificate or like holder that permits the certificate to be easily placed in the same or removed from the same.

A still further object of my invention is to provide a certificate holder adapted to be secured around the steering column of an automotive vehicle that is capable of successfully fitting the various sizes of steering wheel columns found in different makes of automotive vehicles.

A still further object of my invention is to provide a certificate or like holder for holding automobile license certificates, drivers' licenses, etc., that permits the information being held by the holder to be easily viewed from a position inside the vehicle to which it is secured, as well as from a position outside the seating compartment of the vehicle.

A still further object of this invention is to provide a simple, compact, identification or certificate holder for use in vehicles such as automobiles, trucks, or like that may be installed without in any way damaging the vehicle to which it is attached.

A still further object of my invention is to provide a certificate or like holder that does not detract from the refined appearance of the seating compartment of the vehicle and one that is economical in manufacture and durable in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawing, in which:

Fig. 1 is a top plan view of my improved certificate holder ready for use.

Fig. 2 is an enlarged sectional view of the holder taken on line 2—2 of Fig. 1.

Fig. 3 is an enlarged cross-sectional view of a portion of my device taken on line 3—3 of Fig. 1.

Fig. 4 is an enlarged top plan view of one of the hollow flap sleeves of my certificate holder with portions broken away to more fully illustrate the construction and position of the elastic attaching cord.

Fig. 5 is an enlarged sectional view of one of the hook rivets of the holder and is taken on line 5—5 of Fig. 1.

In most, if not all States the law requires the permanent displaying of an automobile certificate or driver's license inside the vehicle. Therefore, driver's certificate holders are well known to the purchasing public, but these holders are usually of rigid frame construction and are designed to be secured to the vehicle by bolts, screws, or the like, thereby making them unhandy to install or remove from the vehicle and permanently damaging the vehicle. Such certificate holders, furthermore, do not permit the ready placement or removal of the certificates in or from the same. Flexible certificate holders that wrap around the steering column are also well known to the trade, but such holders are objectionable in that they do not successfully fit the various diameters of steering wheel columns, nor do they properly enclose and hold the certificate to be displayed. I have overcome such objections, as will hereinafter be appreciated.

The principal portions of my invention are made from a single sheet of flexible material such as leather, leatherette, or like. In the drawing, I have used the numeral 10 to designate the back or base portion of my holder. Each of the shorter ends of this rectangular base portion are first doubled back upon themselves and then this first fold is doubled back to form a hollow flap sleeve with the end portions inside, as shown in Fig. 2. These two hollow sleeves that are positioned at each side of the base portion 10 have been designated by the numeral 11. In order that the hollow flap sleeves will be maintained and normally rest in a proper folded position over the base portion 10, I have stitched each of the sleeves 11 by a single row of stitching 12 which extends transversely of the longitudinal length of the holder and is near the outer edge of each of the sleeves, as shown in Fig. 1 and Fig. 2.

The numeral 13 designates a loop of elastic cord in each of the hollow sleeves. Each of these loops is formed from a single strand of elastic cord having its two upper ends rigidly secured to the upper inside portion of the sleeve in which it resides by a hook rivet 14. It will here be noted that these two hook rivets only extend through the hollow sleeves 11 and do not extend through the base portion 10. The rigid securing of the ends of the two elastic loop cords 13 by the hook rivets is shown in Fig. 5. Each of the elastic cord loops loosely extends downwardly inside their respective hollow sleeves and protrudes a substantial distance from the lower ends of these sleeves, as shown in Fig. 1.

The longer marginal edge portions of the base 10 are doubled back upon themselves to form flanges 15. The numeral 16 designates a transparent flexible window of celluloid, isinglass, or like, which is imposed between the base 10 and the flanges 15. This transparent window is rigidly secured to the base 10 by being stitched to the retaining flanges 15, as shown in the drawing, and has a longitudinal length less than the length of the base 10. In the manufacturing of the device, however, the length of the window 16 must be such that its two ends will extend beneath the hollow sleeves 11 when those members are in normal positions, as shown in Fig. 2.

To insert a certificate to be held and displayed, it is merely necessary to bend back one of the hollow flap sleeves 11 and insert the certificate between the transparent window 16 and base portion 10. The certificate may be as easily removed.

With the certificate or like inside the holder the same is ready to be secured around the steering column of the vehicle and this is easily and quickly done by wrapping the base portion around the steering column and stretching the elastic cords 13 the rest of the way around the steering column and looping them over and in engagement with the two hook rivets respectively. By securing the ends of the elastic cords at the opposite or upper side of the certificate holder, as shown in Fig. 1, elastic loops of substantial length are obtained which would not be the case if the elastic cords were rigidly secured to the lower side edges of the certificate holder. This construction gives a great amount of elasticity to the securing means and makes it possible for my certificate holder to be installed successfully on steering columns of various diameters. Furthermore, when the certificate holder is secured in place about a steering column the elastic bands yieldingly hold the entire widths of the short ends of the certificate holder tightly on and close to the steering column. With the elastic cords extending through the hollow flap sleeves the same will be yieldingly held tightly against and over the open end portions of the transparent window, thereby completely sealing the certificate or driver's license inside the holder. This feature of having end members 11 normally folding over the two open ends of the holder is very important and regardless of what means is employed to secure the holder around the steering column the means used should be such as to yieldingly hold these flap members 11 in a normal closed position over the ends of the transparent window when the device is installed around a steering column.

From the foregoing, it will readily be seen that I have provided a certificate holder that may be quickly and easily placed around steering columns of various sizes, and one that completely embraces the certificate or like being displayed, thereby successfully shielding the certificate or like from the elements.

Some changes may be made in the construction and arrangement of my improved certificate or the like holder without departing from the real spirit and purpose of my invention, and it is my intention to cover by my claims any modified forms of structure or use of mechanical equivolents which may be reasonably included within their scope.

I claim:

1. In a device of the class described, a back portion, a transparent sheet member over said back portion having two of its opposite sides secured to said back portion, a hollow flap sleeve member on one of the side marginal portions of said back member normally resting over one of the unsecured side edge portions of said transparent sheet member, a second hollow flap sleeve member on the opposite side marginal portion of said back member normally resting over an unsecured side marginal portion of said transparent sheet member, and a flexible attaching element extending through each of said hollow flap sleeve members for securing said device to and around the steering column of a vehicle.

2. In a device of the class described, a back portion, a transparent sheet member over said back portion and secured thereto at two of its opposite sides, a hollow flap sleeve member on one of the side marginal portions of said back member normally resting over one of the unsecured side edge portions of said transparent sheet member, a second hollow flap sleeve member on the opposite side marginal portion of said back member normally resting over an unsecured side marginal portion of said transparent sheet member, a flexible cord loop extending into each of said hollow flap sleeve members, and a hook element secured to each of said hollow flap sleeve members.

3. In a device of the class described, a rectangular back portion, a transparent sheet member over said back portion and having two of its edges secured thereto and two of its edges unsecured to form a compartment having two open ends, a flap member at one of the side marginal portions of said back member normally resting over one of the unsecured edges of the compartment formed by said base portion and said transparent sheet member, a second flap member at the opposite side marginal portion of said back member normally resting over the other unsecured edge of said compartment formed by said back portion and transparent sheet member, and a resilient securing means operatively connected to each of said flap members for securing said device to and around the steering column of a vehicle.

4. In a device of the class described, a single base member of flexible material having two of its marginal side edges folded back upon themselves to form sleeves, an elastic cord doubled within each of said sleeves having a loop protruding therefrom, a means for securing said elastic cord to said base member, a hook rivet secured to each of said sleeves capable of being engaged by said elastic cords respectively, and a transparent sheet member secured to said base member having two of its ends extending underneath said two sleeve members respectively when said sleeve members are in a normal position, and the other ends of the transparent material secured to said base member.

5. In a device of the class described, a flexible elongated base member, a flexible transparent sheet member of a length less than the length of said base member secured at two of its side marginal edge portions to said base member, flaps secured to said base member capable of overlapping the unsecured edges of said transparent sheet member when in a normal position, and a resilient means for yieldingly holding said flaps in a normal position and said base member to and around the steering column of a vehicle.

6. In a device of the class described, a flexible elongated base member, a flexible transparent sheet member secured at two of its side edges to said base member to form a compartment having two open ends, a hollow flap member secured to each end of said base member capable of closing the open ends of said compartment when in a normal position, an elastic cord extending through and out one end of each of said hollow flap members and secured thereto, and an elastic cord engaging member secured to the end portion of each of said hollow flap members that is opposite from the end from which the said elastic cord extends.

ANSALEM ORVILLE COBBS.